United States Patent [19]
Woodworth et al.
[11] Patent Number: 4,930,039
[45] Date of Patent: May 29, 1990

[54] FAIL-SAFE SURGE ARRESTER

[75] Inventors: Jonathan J. Woodworth, Portville; Stephen P. Johnson, Olean; David R. Miller, Allegany; Jeffrey J. Kester, Olean; Stanley S. Kershaw, Jr., Portville, all of N.Y.

[73] Assignee: Cooper Industries, Inc., Houston, Tex.

[21] Appl. No.: 339,577

[22] Filed: Apr. 18, 1989

[51] Int. Cl.$^5$ .................... H02H 7/04
[52] U.S. Cl. .................... 361/127; 361/117
[58] Field of Search .................... 361/117, 118, 119, 124, 361/126, 127; 313/231.11

[56] References Cited

U.S. PATENT DOCUMENTS

| | | | |
|---|---|---|---|
| 3,727,108 | 4/1973 | Westrom | 361/127 |
| 4,001,651 | 1/1977 | Kershaw, Jr. | 361/117 |
| 4,161,012 | 7/1979 | Cunningham | 361/127 X |
| 4,240,124 | 12/1980 | Westrom | 361/127 |
| 4,404,614 | 9/1963 | Koch et al. | 361/128 |
| 4,656,555 | 4/1987 | Raudabaugh | 361/127 X |
| 4,686,603 | 8/1987 | Mosele | 361/127 X |
| 4,743,996 | 5/1988 | Book | 361/39 |

OTHER PUBLICATIONS

Ohio Brass Catalog 94: PDV-65 and PDV-100 Distribution Class Surge Arresters, 1988.
Joslyn Manufacturing Co. Publication: ZQP Arresters . . . The Latest in Metal Oxide Polymeric Technologies.

*Primary Examiner*—Derek S. Jennings
*Attorney, Agent, or Firm*—Gregory L. Maag; David A. Rose

[57] ABSTRACT

A fail-safe, non-fragmenting surge arrester includes a liner having outlets formed in the walls thereof for venting ionized gases generated within the liner by internal arcing. The vented ionized gas forms a lower impedance path for the current which is thereby shunted around the failed internal components, preventing the generation of internal pressure which could otherwise cause a fragmenting failure mode of the arrester. The internal components include stacked varistor elements and may include an internal fuse link electrically in series with the varistors.

52 Claims, 4 Drawing Sheets

FAIL-SAFE SURGE ARRESTER

BACKGROUND OF THE INVENTION

The present invention relates generally to apparatus for protecting electrical equipment from damage or destruction due to the presence of electrical overvoltages, such apparatus commonly referred to as a surge arrester. More particularly, the invention relates to a fail-safe, non-fragmenting, surge arrester. Still more particularly, the invention relates to a surge arrester which, in the unlikely event of failure, vents ionized gases generated by internal arcing through outlets provided in the side of the arrester, the ionized gases forming an alternate, lower impedance path for the arc which is thereby shunted around the damaged internal components preventing the generation of further internal pressure which could otherwise cause a catastrophic failure of the arrester.

A surge arrester is commonly connected in parallel with a comparatively expensive piece of electrical equipment to shunt overvoltage surges, such as those caused by lightning strikes, to ground, thereby protecting the equipment and circuit from damage or destruction. A modern surge arrester typically includes an elongated enclosure made of an electrically insulating material, a series of voltage dependent nonlinear resistive elements retained within the housing, and a pair of electrical terminals at opposite ends of the housing for connecting the arrester between line and ground. The voltage dependent nonlinear resistive elements employed are typically, but not restricted to, metal oxide varistor elements formed into relatively short cylindrical disks which are stacked one atop the other within the enclosure. Other shapes and configurations may also be used for the varistor elements. The varistor elements provide either a high or a low impedance current path between the arrester terminals depending or the voltage appearing across the varistor elements themselves. More specifically, at the power system's steady state or normal operating voltage, the varistor elements have a relatively high impedance. As the applied voltage is increased, gradually or abruptly, their impedance progressively decreases until the voltage appearing across the varistors reaches the elements' breakdown voltage, at which point their impedance dramatically decreases and the varistor elements again become highly conductive. Accordingly, if the arrester is subjected to an abnormally high transient overvoltage, such as resulting from a lightning strike or power frequency overvoltage for example, the varistor elements become highly conductive. In this highly conductive mode, the varistor elements serve to conduct the resulting transient current to ground. As the transient overvoltage and resultant current dissipate, the varistor elements' impedance once again increases, restoring the arrester and electrical system to their normal, steady-state condition.

Occasionally, the transient condition may cause some degree of damage to one or more of the varistor elements. Damage of sufficient severity can result in arcing within the arrester enclosure, leading to extreme heat generation and gas evolution as the internal components in contact with the arc are vaporized. This gas evolution causes the pressure within the arrester to increase rapidly until it is relieved by either a pressure relief means or by the rupture of the arrester enclosure. The failure mode of arresters under such conditions may include the expulsion of components or component fragments in all directions. Such failures pose potential risks to personnel and equipment in the vicinity. Equipment may be especially at risk when the arrester is housed within the equipment it is meant to protect, as in the tank of a transformer for example.

Attempts have been made to design and construct arresters which will not catastrophically fail with the expulsion of components or component fragments. One such arrester is described in U.S. Pat. No. 4,404,614 which discloses an arrester having a non-fragmenting liner and outer housing, and a pressure relief diaphragm located at its lower end. A shatterproof arrester housing is also disclosed in U.S. Pat. No. 4,656,555. Arresters having pressure relief means formed in their ends are described in U.S. Pat. Nos. 3,727,108, 4,001,651 and 4,240,124. Despite such advances, however, state of the art arresters may still fail with expulsion of components or fragments of components. This may in part be due to the fact that once the internal components in these arresters fail, the resulting arc vaporizes the components and generates gas at a rate that can not be vented quickly enough to prevent rupture of the arrester enclosure. Accordingly, there exists a need in the art for an arrester which, upon failure, will fail in a non-fragmenting manner. Preferably, such an arrester will eliminate the possibility of catastrophic failures by transferring the failure-causing arc away from the internal components, thereby preventing the generation of any additional pressure. One means by which this end may be accomplished is to design an improved arrester which will transfer the arc outside the arrester and shunt the current around the failed internal components.

SUMMARY OF THE INVENTION

Accordingly, there is provided a fail-safe, non-fragmenting surge arrester structured to prevent catastrophic arrester failures. The arrester of the present invention includes a subassembly enclosure, one or more electrical components stacked in series relationship within the enclosure, and outlets or ports formed in the wall of the enclosure for transferring an internal arc outside a length of the enclosure and diverting the arc current around some, or all, of the internal components. The internal electrical components may include, for example, voltage dependent nonlinear resistive elements and fuse links. The ports or outlets provide for the venting of ionized gas through the wall of the enclosure, the gas forming an alternate conducting path in parallel with the higher impedance path formed by the internal components.

The subassembly enclosure includes an insulative conduit or tubular liner closed at its ends by end caps or closures which are in electrical contact with the internal components and have threaded bores for receiving line and ground terminals. The closures are attached to the ends of the liner or conduit by mechanical fasteners, bonding, compression rings or by threaded engagement. Alternatively, the subassembly enclosure may be formed of a composite material in the shape of a vessel, the vessel-shaped enclosure including an annular bore formed therein for retaining the electrical components, and a composite cap and bottom including conductive portions contacting the internal components and the line and ground terminals.

The outlets may include an array of one or more longitudinal slits or apertures formed in particular the wall of the enclosure, or alternatively may include one or more rows of vertically aligned perforations. The outlets may also include thin-walled portions formed in the wall of the enclosure, these portions fracturing with increased internal pressure so as to vent the ionized gas before the pressure generated inside the enclosure exceeds the bursting strength of the enclosure.

The invention further provides for directionally venting the ionized gas from the subassembly and thereby controlling the location of the diverted current and resulting arc with respect to nearby equipment or structures. Such directional vents include vertically aligned slits, apertures, perforations or thin-walled portions formed in particular arcuate segments of the enclosure, rather than spaced about the enclosure's entire circumference.

The invention additionally includes a non-fragmenting insulative housing for hermetically sealing and protecting the subassembly enclosure and internal electrical components from the ambient environment, and includes terminals for interconnecting the subassembly between line and ground.

The invention further includes a fuse link module for use in a surge arrester, the module including a pair of conducting plates, insulated standoffs for maintaining a gap or separation between the plates, and a fusible element electrically connected to the plates across the gap. With this internal fuse link module, upon failure, the arrester will fail as an open circuit between line and ground without the need for a conventional external ground lead disconnector.

Thus, the present invention comprises a combination of features and advantages which enable it to substantially advance arrester technology by providing a non-fragmenting, and thus fail-safe, arrester for use in a variety of insulating media. These and various other characteristics and advantages of the present invention will be readily apparent to those skilled in the art upon reading the following detailed description and referring to the accompanying drawings.

BRIEF DESCRIPTION OF THE DRAWINGS

For an introduction to the detailed description of the preferred embodiment of the invention, reference will now be made to the accompanying drawings, wherein.

DESCRIPTION OF THE PREFERRED EMBODIMENT

Surge arresters are installed in electrical systems for the purpose of diverting dangerous overvoltage surges to ground before such surges can damage expensive electrical equipment. Even current, state of the art arresters will sometimes fail, however, and may fail in catastrophic, explosive fashion. When a catastrophic explosive failure occurs, shrapnel-like arrester fragments may damage equipment and endanger personnel. Thus, it is desirable that a surge arrester be designed and constructed to have a predictable, controlled, and non-fragmenting failure mode.

Figure 1:
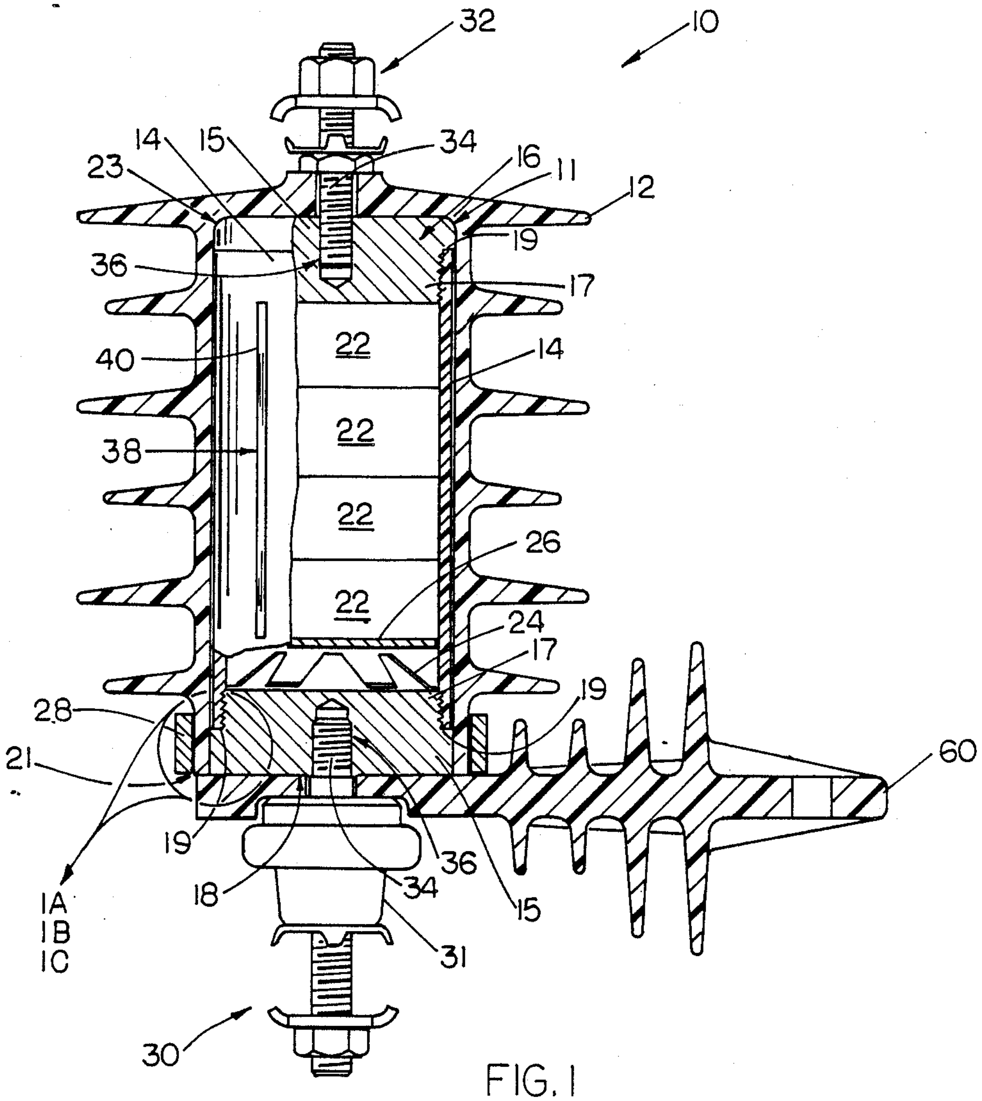
FIG. 1 shows an elevation view, partly in cross section, of the fail-safe surge arrested of the present invention.

Referring initially to FIG. 1, there is shown a fail-safe surge arrester 10 structured in accordance with the principles of the present invention. Arrester 10 generally comprises, an insulative and protective housing 12, an inner arrester subassembly 11, and ground and line terminals 30 and 32, respectiVely.

The skirted housing 12 is made of a non-fragmenting, shatterproof material and physically covers, protects and electrically insulates the subassembly 11. Subassembly 11 in turn houses the operative components of arrester 10. It is preferred that housing 12 be made from elastomeric materials such as ethylene propylene based monomers or silicone based rubbers, silicone based rubbers being currently preferred. These materials provide superior outdoor insulating properties, although other polymeric materials may be employed. Housing 12 substantially envelopes and houses subassembly 11 and hermetically seals the subassembly from the ambient environment. Housing 12 is sealingly attached to the lower end 21 of subassembly 11 by a metal compression ring 28.

Subassembly 11 and housing 12 are supported by an insulative hanger 60 which preferably is manufactured of glass filled polyester, although other polymeric materials may be employed. Subassembly 11 and housing 12 are secured to hanger 60 by ground terminal 30, the shank portion 34 of which is received through an aperture in hanger 60 and threadedly engages a threaded bore 36 in the lower end 21 of subassembly 11. A conventional ground lead disconnector 31 is fastened to ground terminal 30 and employed to physically disconnect the ground wire (not shown) from the arrester 10 when the disconnector reaches a predetermined temperature by the ignition of an explosive charge. This may occur, for example, when the arrester has failed to prevent the flow of the steady state, power-frequency current after a surge, and is therefore acting as a short circuit to ground.

Referring still to FIG. 1, subassembly generally comprises subassembly module or liner 14, top and bottom closures 16 and 18 respectively, pressure relief means 38 and nonlinear resistors 22, which preferably are metal oxide varistors. Liner 14 is preferably manufactured of fiberglass, although other materials may be employed, and is formed into a rigid tube or conduit having a wall adequately thick to support subassembly 11. A liner having a thickness of approximately 0.090 inches has proven satisfactory in many applications. Liner 14 is closed at both ends by top and bottom closures 16 and 18 which are substantially identical. Closures 16 and 18 are relatively short cylindrical disks machined or cast from any conducting material, preferably aluminum, and having a reduced diameter portion so as to form an outer cap portion 15 and an inner plug portion 17. The cap portion 15 has a diameter equal to the outside diameter of liner 14, and the plug portion 17 has the reduced diameter which is substantially equal to the inside diameter of liner 14. The union of cap portion 15 and plug portion 17 forms a shoulder 19. The plug portion 17 of closures 16 and 18 are received within the open ends of liner 14, the terminal ends of liner 14 matingly engaging shoulders 19. Closures 16 and 18 are attached to liner 14 at ends 21 and 23. In the preferred embodiment, as shown in FIG. 1, closures 16 and 18 are attached to liner 14 at ends 21 and 23 by engaging threads machined into liner 14 and plug portions 17 of closures 16 and 18.

Figure 1A:
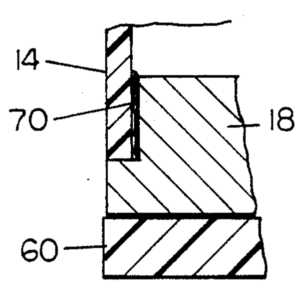
FIGS. 1A, 1B and 1C show, in cross section, expanded views of alternative means for joining portions of the arrester shown in FIG. 1.
Figure 1B:
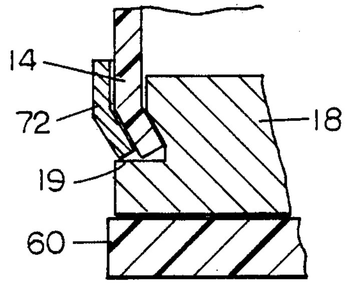
Figure 1C:
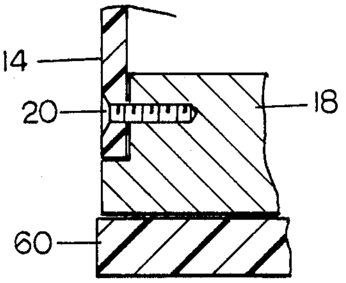

Alternative means are shown for securing closures 16 and 18 to liner 14 in FIGS. 1A–1C. As shown in FIG. IA, liner 14 may be bonded to closures 16 and 18 as at joint 70 by a suitable glue or epoxy. A further alternative is shown in FIG. 1B where closures 16 and 18 are secured to liner 14 by means of a magniformed retention ring 72, which secures liner 14 to closures 16 & 18 by compressing and deforming the terminal ends of liner 14 into the closures 16 and 18 at shoulder 19. Another alternative, as shown in FIG. 1C, is to provide fasteners 20, which may be rivets or screws, for example, which engage liner 14 and the plug portions 17 of closures 16 and 18. It is of course understood that an arrester of the present invention may be constructed by using any combination of the securing means just described or other similar techniques.

Referring again to FIG. 1, the internal components enclosed within subassembly 11 include a plurality of varistor elements 22, one or more conductive plates 26 and a compression spring 24. The varistor elements 22 are preferably metal oxide varistor which are formed into short cylindrical disks having a diameter slightly less than the inside diameter of liner 14 such that elements 22 may be received within liner 14. Varistor elements 22 are stacked in series relationship within liner 14 to provide a series path for surge current through the stack of varistor elements 22. As shown, compression spring 24 is biased between, and in electrical contact with, bottom closure 18 and conductive plate 26 which is positioned below the lower most varistor element 22 in the varistor element stack. The spring 24 may alternatively be placed anywhere in the stacked arrangement. When spring 24 is placed between two varistor elements 22, two plates 26 will be included, one between spring 24 and each adjacent varistor element 22. In any arrangement, plates 26 and spring 24 cooperate to provide an axial load against the varistor element stack sufficient to maintain the varistor elements 22 in intimate contact with one another as is necessary for good electrical contact and for the arrester to function properly. Plates 26 also serve as heat sinks to help dissipate heat generated within the arrester 10 when operating to dissipate surge energy. Accordingly, if desired, plates 26 may be positioned between all or any number of the varistor elements 22 in subassembly 11.

Figure 2:
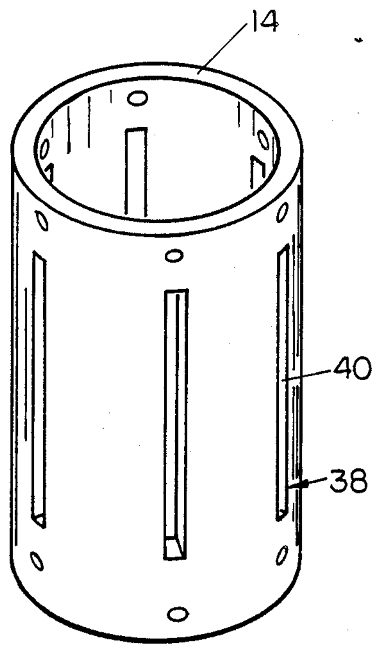
FIG. 2 shows a perspective view of the subassembly liner of the surge arrester shown in FIG. 1.

The pressure relief means 38 is best understood with reference to FIG. 2. As shown in FIG. 2, pressure relief means 38 comprises a plurality of ports or outlets 40 in the form of elongated apertures extending longitudinally in the sides of liner 14. Outlets 40 extend through the entire thickness of liner 14. As depicted in FIG. 2, the plurality of parallel outlets 40 are spaced about the circumference of liner 14 at regular arcuate intervals. In the preferred embodiment, six outlets 40 are arcuately spaced sixty degrees apart around the circumference of liner 14; however, a variety of other configurations can be employed. Referring again to FIG. 1, it can be seen that the length of a outlet 40 is approximately equal to the height of the stack of varistor elements 22.

In operation, the arrester 10 of the present invention is installed in parallel with the electrical equipment it is intended to protect by connecting line terminal 32 to a power carrying conductor, and connecting ground terminal 30 to ground. After installation, if any of the varistor elements 22 in arrester 10 should experience a dielectric breakdown or fail for other reasons during operation, the voltage which builds across the defective varistor element or elements 22 will cause an internal arc to form across the failed element or elements as the current continues to be conducted through the arrester. The arc, which may burn at a temperature of several thousand degrees, will vaporize the internal components of subassembly 11 that are in contact with the arc, such components including the varistor elements 22 as well as conductive plates 26 and compression spring 24. As the arc continues to burn, a large volume of ionized gas is generated within subassembly 11. This ionized gas is vented out the side of liner 14 of subassembly 11 through the vertically formed outlets 40, thereby creating an alternate conducting path of ionized gas in parallel with the path formed by the varistor elements 22 of arrester 10. When ionized gas is vented through the outlets 40 of liner 14, housing 12 may initially stretch to accommodate the increased volume, or it may rupture due to the increased internal pressure. In either event, the ionized gas, now outside subassembly 11, forms a lower impedance path for the current than the path available inside subassembly 11. Thus, the current being conducted by arrester 10 diverts to the lower impedance alternate path formed by the ionized gas, and an external arc is formed around the failed internal elements. When this occurs, the internal arc is effectively transferred to the alternate path. Since the internal arc has been diverted around the failed elements, the generation of further pressure within arrester 10 is prevented. Outlets 40 limit the arrester's internal pressure to a pressure below the bursting pressure of the subassembly 11, thereby preventing any fracture of the arrester 10 and the expulsion of components or component fragments.

Figure 2A:
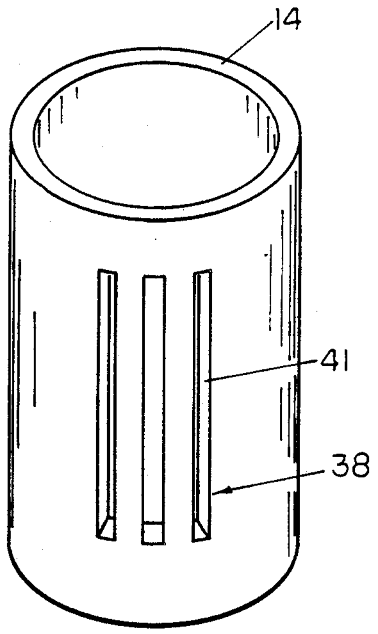
FIGS. 2A, 2B, 2C, and 2D show perspective views of alternative embodiments of the subassembly liner shown in FIG. 2.

When arrester 10 is installed near electrical equipment or other structures, it may be desirable to directionally vent the ionized gas and divert the internal arc in a direction away from such structures and equipment. Accordingly, FIGS. 2A–D illustrate alternative embodiments of the arrester liner 14 and pressure relief means 38 which are designed to directionally control the arc transfer. Referring initially to FIG. 2A, three parallel vertical outlets 41 are shown in relatively close proximity to one another, the array of outlets 41 being formed within an arcuate segment of liner 14, preferably equal to approximately sixty degrees. The arrester 10 is installed such that the array of outlets 41 faces in a direction opposite to that of the electrical equipment or structure. Installed in this manner, directional outlets 41 vent the gas generated within a failed arrester away from the nearby equipment or structures to ensure that the exposed arc does not damage the equipment or structures.

Figure 2B:
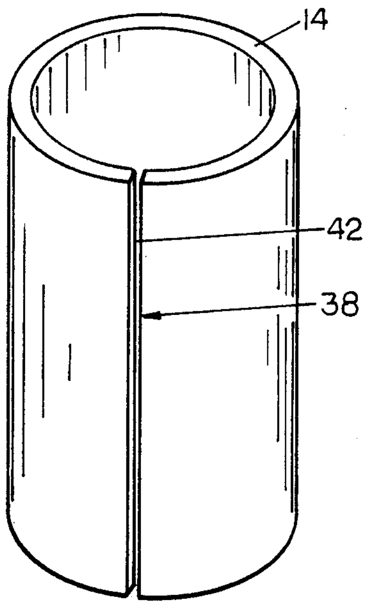

Another alternative embodiment of liner 14 and pressure relief means 38 is shown in FIG. 2B where a single outlet 42 extends the entire vertical length of liner 14. Outlet 42 also provides directional control for transferring the arc outside the arrester and away from nearby equipment and the like. While it is not important to the operation of the arrester 10 that the outlet 42 extend the entire length of the liner 14, this design is more easily manufactured than those of FIG. 2 and 2A where the length of outlets 40 and 41 is matched to the height of the varistor element stack.

Figure 2C:
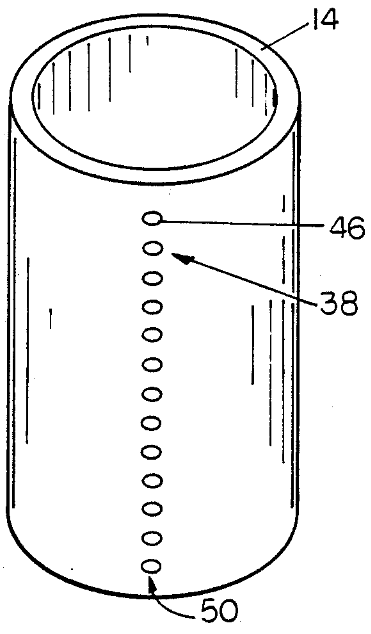
Figure 2D:
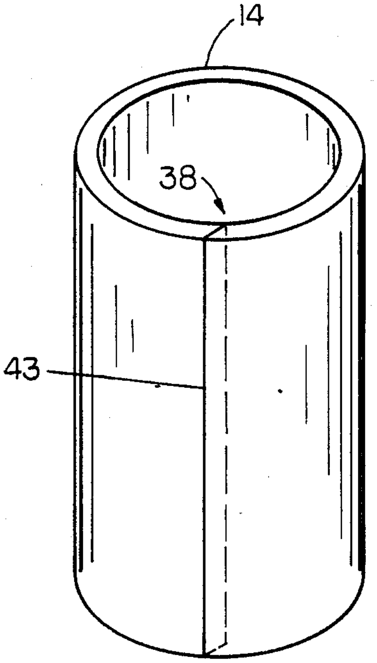

A modification of the embodiment shown in FIG. 2B is shown in FIG. 2D where the outlet 43 is formed by overlapping the opposing vertical edges or sides of the outlet 43. This embodiment also provides manufacturing advantages as it will allow the use of varistor blocks with less-exacting manufacturing tolerances, since its overlapping vertical sides accommodate varistor blocks having slightly differing diameters.

Another alternative embodiment of pressure relief means 38 is shown in FIG. 2C. In this embodiment, pressure relief means 38 comprises a plurality of aligned perforations or apertures 46 formed in a vertical row 50 parallel to the axis of liner 14.

Figure 3:
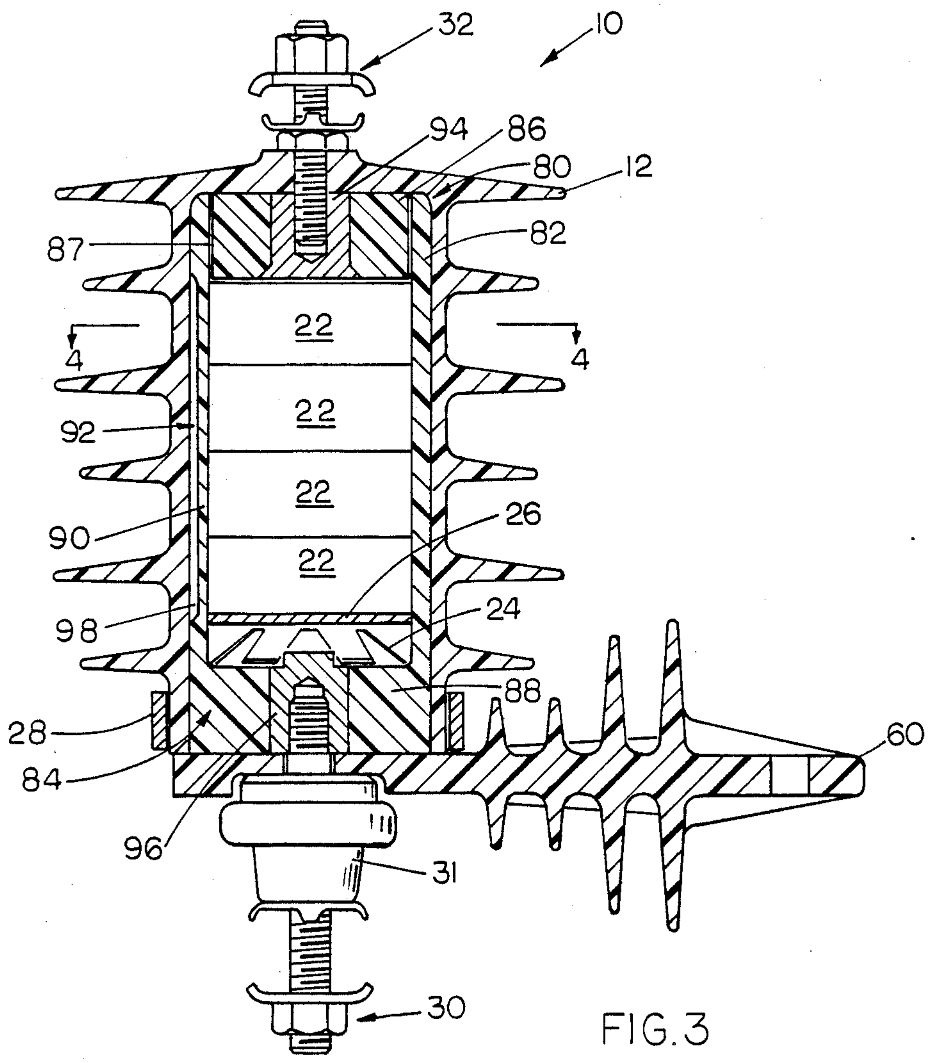
FIG. 3 an elevation view, partly in cross section, of an alternative embodiment of the surge arrester of the present invention.

Referring now to FIG. 3, there is shown an alternative embodiment of the fail-safe arrester 10. As shown, subassembly 80 is sealed within insulative housing 12 and supported on hanger 60 as previously described with respect to the embodiment of FIG. 1. In this embodiment, however, subassembly 80 generally comprises a vessel-like liner 84 made of an insulating material, such as a glass-filled polyester or other composite material, having a base 88 and an upwardly projecting cylindrical wall 82. Cylindrical wall 82 has a thickness similar to that previously disclosed with respect to liner 14 of FIG.

Retained in series relationship within the annular bore 89 formed by cylindrical wall 82 of liner 84 are varistor elements 22, conductive plates 26 and compression spring 24, all as described previously. A subassembly closure cap 86, also formed of a composite material, such as glass-filled polyester, is received within the top of cylindrical wall 82 of liner 84 and bonded at joint 87 so as to seal varistor elements 22 within the annular bore 89. Alternately, cap 86 and cylindrical wall 82 may be manufactured with threads for threaded engagement at joint 87. Incorporated into cap 86 and base 88 during manufacture are line and ground terminal blocks 94 and 96 respectively. Terminal blocks 94 and 96 are made of any conducting material, preferably aluminum, and are manufactured with threaded bores for engagement with line and ground terminals 32 and 30, which serve to electrically interconnect varistor elements 22 between line and ground.

Figure 4:
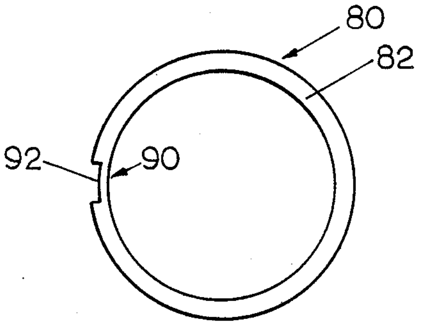
FIG. 4 shows a cross section of the surge arrester shown in FIG. 3 taken along the plane at 4—4.

Referring to FIGS. 3 and 4, subassembly 80 includes at least one channel 92 formed longitudinally on the outer surface of cylindrical wall 82 generally parallel to the axis of annular bore 89, channel 92 thereby forming a thin-walled section 90 in wall 82. The thickness of section 90 is such that it opens and vents gas before subassembly 80 ruptures. As an example, in a liner 84 having a thickness of approximately 0.090 inches, a channel 92 with a depth of 0.075 inches has proven to function reliably. As best shown in FIG. 3, when hermetically sealed within housing 12, channel 92 forms an air gap or void 98 between wall 82 and the inner surface of housing 12.

Figure 4A:
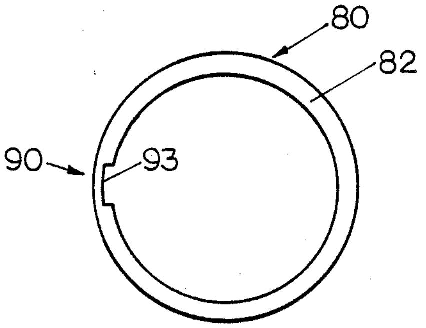
FIG. 4A shows, in cross section, an alternative embodiment of the subassembly liner for the arrester shown in FIG. 4.

When installed, the fail-safe arrester 10 shown in FIGS. 3 and 4 operates in a similar manner as that described above with respect to the embodiment shown in FIG. 1. Specifically, when arrester components fail and an arc forms within the arrester 10, the heat and pressure increase until all or portions of the thin-walled section 90 fracture along channel 92. When this occurs, the generated gas is vented out through the newly-formed aperture in the side of liner 84 and forms a conductive path of ionized gas. The internal arc is thereby transferred outside subassembly 80, and outside arrester 10 as housing 12 is vaporized, and the current is diverted around failed varistor elements 22 preventing the generation of additional gas and pressure. As shown in FIG. 4A, an interior channel 93 may be formed along the inner surface of the cylindrical wall 82 as an alternative formation of a thin-walled section 90. Whether formed on the inner or outer surface of vessel wall 82, channels 92 and 93 provide a means for venting the generated gas out of subassembly 80 and directing the external exposed arc away from nearby equipment and structures. If directional venting is not desired, a plurality of channels 92 and 93 can be formed in the walls 82 around the circumference of subassembly 80.

Figure 5:
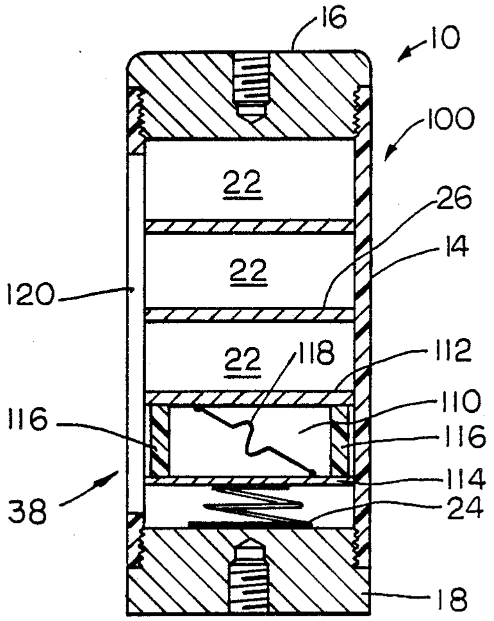
FIG. 5 shows a partial cross sectional view of another alternative embodiment of the surge arrester of the present invention.

While the disclosure above has described subassemblies 11 and 80 as comprising voltage dependent nonlinear varistor elements 22 housed within liners 14 and 84, it should be understood that the invention contemplates the use of other electrical components in place of, or in addition to, the varistor elements 22, such components including, for example, spark gap assemblies, resistors, capacitors, insulators and fuse links. The inclusion of such components may be useful and advantageous in both surge arresters and in other types of electrical assemblies. Referring to FIG. 5, there is shown a surge arrester 1? made in accordance with the principles of the present invention and suitable, for example, for use in under-oil applications such as in transformers, circuit brakers and related equipment. In this embodiment, arrester 10 includes subassembly 100 having a tubular liner 14, top closure 16, bottom closure 18, pressure relief means 38, varistors 22, plates 26 and spring 24 all as previously described with reference to FIG. 1. In this embodiment, however, subassembly 100 further comprises a fuse link module 110 retained in series relationship with varistors 22 within liner 14.

Fuse link module 110 includes conducting plates 112, 114 insulating standoffs 116 and a fusible element 118. Fusible element 118, which may be a fuse link of tin, copper or silver for example, is electrically connected between conducting plates 12, 114 by soldering or by other means well known to those skilled in the art, thereby forming a series electrical path through fuse link module 110. Insulating standoffs 104, which may be made of fiber glass or other such insulating material, are spacers or supports which are spaced apart along the perimeter of plates 26 and held in position by the axial force applied by spring 24. Standoffs 104 may comprise post-like supports or alternatively may comprise arcuately shaped supporting segments formed of an insulative material. Pressure relief means 38 includes one or more longitudinal outlets 120 formed in liner 14, outlet 120 having a length approximately equal to the height of the stack of electrical components within liner 14. As can be seen, without an outer housing surrounding subassembly 100, oil, air, SF6 or other insulating media surrounding subassembly 100 may freely flow into the subassembly through outlets 120 and into fuse link module 110 between standoffs 104 so as to completely surround fusible element 118.

The addition of the fuse link module 110 in arrester 10 serves to eliminate the need for ground lead disconnector 31 as is shown in FIG. 1. When an arrester fails, it may thereafter act as a short circuit, conducting steady state power frequency current to ground. For this reason an external isolator or ground lead disconnector 31 is typically provided to explosively disconnect the ground lead from the arrester, thereby severing the current path to ground. Operation of the ground lead disconnector 31 may itself project fragments potentially damaging to nearby equipment. By contrast, arrester 10 having an internal fuse link module 110 is fail-safe both because of the inventive features making it non-fragmenting, and because, upon failure, the fusible element 118 in fuse link module 110 will melt and open the series electrical path formed through arrester 10, thereby eliminating the requirement for an external disconnector 31 which is itself a possible source of damaging fragments. Arrester 10 shown in FIG. 5 is particularly suited for use inside oil filled transformers, circuit breakers and similar equipment, where the arrester assembly is in close proximity to transformer windings or operating mechanisms that would be susceptible to damage or short circuits resulting from arrester or disconnector fragments. Additionally, an arrester having the inventive fuse link module 110 can be manufactured at a lower cost than a similar arrester that employs an external ground lead disconnector.

While the preferred embodiment of this invention has been shown and described, modifications thereof can be made by one skilled in the art without departing from the spirit of the invention. The embodiments described herein are exemplary only and are not limiting. Many variations and modifications of the system and apparatus are possible and are within the scope of the invention. Accordingly, the scope of protection is not limited by the above description, but is only limited by the claims which follow, that scope including all equivalents of the subject matter of the claims.

What is claimed is:

1. An electrical assembly comprising:

at least one electrical component for electrical connection between a voltage and ground, said electrical component including a current path therethrough;

an insulative module having side walls for containing said electrical component; and means in said side walls of said module for diverting current outside a length of said module and around a portion of said electrical component.

2. The electrical assembly of claim 1 wherein said diverting means comprises means for venting ionized gas through said side walls of said module, the gas forming a lower impedance current path in parallel with the current path through said component.

3. The electrical assembly of claim 2 wherein said venting means comprises at least one outlet formed in said side wall of said module.

4. An electrical assembly comprising:

at least one electrical component for electrical connection between a voltage and ground, said electrical component including a current path therethrough;

an insulative module for containing said electrical component; and means in said module for diverting current outside a length of said module and around a portion of said electrical component, said diverting means comprising means for venting ionized gas through said module, the gas forming a lower impedance current path in parallel with the current path through said component wherein said venting means comprises a plurality of apertures spaced around the circumference of said module.

5. The electrical assembly of claim 4 wherein said apertures are spaced approximately sixty degrees apart around the circumference of said module.

6. An electrical assembly comprising:

at least one electrical component for electrical connection between a voltage and ground, said electrical component including a current path therethrough;

an insulative module for containing said electrical component, said module including a fiberglass liner; and means in said module for diverting current outside a length of said module and around a portion of said electrical component, said diverting means comprising means for venting ionized gas through said module, the gas forming a lower impedance current path in parallel with the current path through said component.

7. The electrical assembly of claim 2 wherein said module comprises means for directionally venting ionized gas from said module through said side walls of said module.

8. The electrical assembly of claim 7 wherein said directional venting means comprises a tubular liner having an array of apertures formed in an arcuate segment in the sides of said liner, said array forming said directional venting means.

9. The electrical assembly of claim 8 wherein said arcuate segment comprises approximately sixty degrees of said tubular liner.

10. The electrical assembly of claim 8 wherein said array comprises three apertures.

11. The electrical assembly of claim 7 wherein said directional venting means comprises a tubular liner having a single aperture formed longitudinally through the entire length of the side wall of said liner.

12. The electrical assembly of claim 7 wherein said directional venting means comprises a tubular liner having at least one longitudinal row of perforations formed in the side wall of said liner.

13. The electrical assembly of claim 7 wherein said directional venting means comprises a generally tubular liner having unjoined overlapping edges, said overlapping edges forming said directional venting means.

14. The electrical assembly of claim 2 wherein said module includes a channel formed longitudinally along a portion of said side wall of said module, said channel defining a thin-walled section of said module and forming said venting means.

15. An electrical assembly comprising:

at least one electrical component for electrical connection between a voltage and ground, said electrical component including a current path therethrough;

an insulative module made of a polymeric material for containing said electrical components; and means in said module for diverting current outside a length of said module and around a portion of said electrical components, said diverting means comprising means for venting ionized gas through said module, the gas forming a lower impedance current path in parallel with the current path through said components, wherein said module includes a channel formed longitudinally along a portion of the wall of said module, said channel defining a thin-walled section of said module and forming said venting means.

16. An electrical subassembly comprising:

a plurality of electrical components connected in series and forming an electrical path for conducting current through the subassembly;

an enclosure having side walls made of insulative material for retaining said components in stacked relationship within the subassembly; and means in said side walls for transferring an arc generated within said enclosure outside said enclosure for shunting the current around a portion of said stack of electrical components.

17. The subassembly of claim 16 wherein said arc transferring means comprises at least one outlet formed through said side wall of said enclosure for venting ionized gas generated within said enclosure through said outlet, said ionized gas forming a conductive path in parallel to said electrical path of said electrical components.

18. The subassembly of claim 17 wherien said outlet comprises at least one longitudinal aperture.

19. The subassembly of claim 17 wherein said outlet comprises a plurality of perforations through said wall.

20. The subassembly of claim 17 wherein said outlet comprises a longitudinal joint made by splitting said wall.

21. The subassembly of claim 16 wherein said arc transferring means comprises at least one thin-walled section formed in said side wall of said enclosure.

22. An electrical subassembly comprising:

a plurality of electrical components connected in series and forming an electrical path for conducting current through the subassembly;

an enclosure of insulative material for retaining said components in stacked relationship within the subassembly; and means for transferring an arc generated within said enclosure outside said enclosure for shunting the current around a portion of said stack of electrical components, said arc transferring means comprising at least one thin-walled section formed in the wall of said enclosure wherein said thin-walled section has a length which approximates the height of said components.

23. The subassembly of claim 17 wherein said electrical components comprise a plurality of voltage dependent non-linear resistive elements.

24. The subassembly of claim 23 wherein said electrical components further comprise at least one fuse link module.

25. The surge arrester of claim 24 wherein said fuse link module is stacked and retained in series relationship with said resistive elements within said enclosure, said fuse link module comprising:

a pair of conducting plates in electrical contact with said resistive elements;

a plurality of insulating standoffs between said conducting plates for maintaining a gap between said conducting plates; and a fuseable element electrically connected to said conducting plates across said gap.

26. A surge arrester comprising:

a housing made of a nonfragmenting insulative material;

an enclosure, hermetically sealed from the ambient environment by said housing;

a plurality of varistor elements stacked and retained in series relationship within said enclosure;

means formed in the side wall of said enclosure for relieving pressure within said enclosure upon the generation of ionized gas within said enclosure; and terminals for electrically connecting said enclosure between a line voltage and ground.

27. The surge arrester of claim 26 wherein said enclosure comprises an insulative conduit and top and bottom closures attached to said insulative conduit, said closures being made from conducting material and electrically connected to said terminals.

28. The surge arrester of claim 27 wherein said pressure relief means comprises at least one outlet formed in said side wall of said insulative conduit.

29. The surge arrester of claim 28 wherein said outlet comprises at least one longitudinal aperture.

30. The surge arrester of claim 28 wherein said outlet comprises at least one longitudinal row of perforations.

31. The surge arrester of claim 28 wherein said outlet comprises a longitudinal joint made by the overlapping but unattached edges of the material forming said insulative conduit.

32. The surge arrester of claim 28 wherein said outlet comprises an array of longitudinal apertures formed in an arcuate segment of said insulative conduit.

33. The surge arrester of claim 26 wherein said enclosure comprises a bottom, side walls, and top closure all formed of a composite material, said top closure and said bottom having conducting portions therein for engagement with said line and ground terminals.

34. The surge arrester of claim 33 wherein said pressure relief means comprises at least one thin-walled portion formed in said side wall of said enclosure.

35. The surge arrester of claim 34 wherein said thin-walled portion extends vertically along said side wall of said enclosure. for the length of said stack of varistor elements.

36. The surge arrester of claim 26 further comprising a fuse link within said enclosure connected in series with said varistor elements.

37. A surge arrester comprising:

an insulative module for retaining electrical components therein;

a plurality of outlets formed in said module for venting gas from within said module;

a plurality of nonlinear resistive elements retained within said module; and a fuse link module retained within said module, said resistive elements and said fuse link module being in electrical contact and forming a series path for current through said module.

38. The surge arrester of claim 37 wherein said fuse link module comprises:

a pair of conducting plates in electrical contact with said resistive elements;

a plurality of insulating standoffs between said conducting plates for maintaining a gap between said conducting plates; and a fuseable element electrically connected to said conducting plates across said gap.

39. The surge arrester of claim 37 wherein said outlets are spaced apart along the entire periphery of said module.

40. The surge arrester of claim 37 wherein said nonlinear resistive elements are retained in a stacked relationship within said module and wherein said outlets are formed in said module along the entire length of said stack of resistive elements.

41. The surge arrester of claim 37 wherein said outlets are formed adjacent to each of said nonlinear resistive elements.

42. The surge arrester of claim 40 wherein said outlets are spaced apart along the periphery of said module at regular arcuate intervals.

43. A surge arrester comprising:

a plurality of nonlinear resistive elements;

an insulative module having side walls for retaining said resistive elements in a stacked relationship; and means spaced along the periphery of said module for radially venting gas through said side walls of said module.

44. The surge arrester of claim 43 further comprising an elastomeric and insulative housing covering said module.

45. The surge arrester of claim 44 wherein said venting means comprises a plurality of outlets formed in the side walls of said module.

46. The surge arrester of claim 44 wherein said venting means comprises a plurality of channels formed in said side walls of said module, said channels defining thin-walled sections of said module and forming said radial venting means.

47. The surge arrester of claim 45 wherein said outlets are spaced about the periphery of said module at regular arcuate intervals.

48. The surge arrester of claim 45 wherein said outlets comprise at least one row of perforations formed in said side walls.

49. The surge arrester of claim 45 wherein said outlets comprise slots formed in said module adjacent to each of said resistive elements.

50. The surge arrester of claim 49 wherein said slots are spaced about the periphery of said module at regular arcuate intervals.

51. The surge arrester of claim 46 wherein said channels are spaced around the periphery of said module at regular arcuate intervals.

52. The surge arrester of claim 46 wherein said channels are formed in said module adjacent to each of said resistive elements.

* * * * *